United States Patent
Shout et al.

(10) Patent No.: US 12,065,082 B2
(45) Date of Patent: Aug. 20, 2024

(54) POSITIONING SYSTEM FOR POSITIONING A DISPLAY DEVICE IN A MOTOR VEHICLE, AND A MOTOR VEHICLE

(71) Applicant: Volkswagen Aktiengesellschaft, Wolfsburg (DE)

(72) Inventors: Sabine Shout, Wolfsburg (DE); Ralf Syldatke, Dortmund (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 185 days.

(21) Appl. No.: 17/711,143

(22) Filed: Apr. 1, 2022

(65) Prior Publication Data
US 2022/0227307 A1    Jul. 21, 2022

Related U.S. Application Data

(63) Continuation of application No. PCT/EP2020/077030, filed on Sep. 28, 2020.

(30) Foreign Application Priority Data

Oct. 2, 2019  (DE) .................... 10 2019 215 197.3

(51) Int. Cl.
*B60R 11/02* (2006.01)
*B60K 35/00* (2006.01)
(Continued)

(52) U.S. Cl.
CPC .......... *B60R 11/0235* (2013.01); *B60K 35/00* (2013.01); *B60R 21/045* (2013.01); *B60R 2011/0005* (2013.01)

(58) Field of Classification Search
CPC ....... B32B 3/30; B32B 15/04; B32B 2439/40; B32B 2250/03; B32B 2250/40;
(Continued)

(56) References Cited

U.S. PATENT DOCUMENTS 6,883,759 B2    4/2005  Park et al.
7,300,024 B2 *  11/2007 Slatosch ............. B60R 11/0235
                                                     248/371
(Continued)

FOREIGN PATENT DOCUMENTS

CN          1443670 A        9/2003
DE    102013003942 A1 *      9/2014  ............. B60K 35/00
(Continued)

OTHER PUBLICATIONS

International Search Report dated Dec. 15, 2020 in corresponding application PCT/EP2020/077030.
(Continued)

*Primary Examiner* — Pinel E Romain
(74) *Attorney, Agent, or Firm* — Muncy, Geissler, Olds & Lowe, P.C.

(57) ABSTRACT

A positioning system for positioning a display device for presenting visually perceptible information in a motor vehicle, the positioning system includes a display and a guide system with at least one rail element, and with at least one slide element guidable with the rail element. One of the two elements is fixed by a connection device to the display device and the respective other element is designed to be connected to a supporting structure or a transverse member of an instrument panel. At least one securing element which is rigidly connected by a first end region to the display device and by a second end region to the element designed for connection to the supporting structure. Under action of specific pulses, the guide system can achieve a substantially translational displacement of the display device by a relative movement between the rail element and the slide element in the guide plane.

11 Claims, 4 Drawing Sheets

(51) Int. Cl.
*B60R 21/045* (2006.01)
*B60R 11/00* (2006.01)

(58) Field of Classification Search
CPC ........ B32B 2266/025; B32B 2307/732; B32B 3/12; B32B 3/263; B32B 3/266; B32B 5/02; B32B 5/18; B32B 5/245; B32B 9/041; B32B 9/045; B32B 9/047; B32B 15/043; B32B 15/046; B32B 15/085; B32B 15/10; B32B 15/12; B32B 15/14; B32B 15/18; B32B 15/20; B32B 21/08; B32B 21/10; B32B 27/065; B32B 27/08; B32B 2262/101; B32B 2262/106; B32B 2605/00; B32B 9/005; B32B 27/10; B32B 27/12; B32B 27/32; B32B 29/02; B29C 51/08; B29C 51/10; B29C 51/12; B29C 51/264; B29C 51/266; B62D 33/046; B62D 63/06; B65D 90/022; B29L 2031/3041
USPC ....... 296/70, 72, 37.12, 24, 29, 34; 160/323; 248/560
See application file for complete search history.

(56) References Cited

U.S. PATENT DOCUMENTS

| | | |
|---|---|---|
| 7,419,123 B2 | 9/2008 | Park et al. |
| 7,494,100 B2 | 2/2009 | Tanaka et al. |
| 7,712,707 B2 | 5/2010 | Slatosch et al. |
| 8,454,073 B2 * | 6/2013 | Grandel ............. B60R 11/0235 296/70 |
| 8,625,034 B2 | 1/2014 | Campbell et al. |
| 9,487,157 B1 | 11/2016 | Vinton |
| 2009/0316057 A1 | 12/2009 | Campbell et al. |
| 2014/0320768 A1* | 10/2014 | Hagiwara ........... G02F 1/13338 349/12 |
| 2017/0232844 A1* | 8/2017 | Sugiyama ............. B60K 35/00 248/27.1 |

FOREIGN PATENT DOCUMENTS

| | | | |
|---|---|---|---|
| DE | 102013003942 A1 | 9/2014 | |
| DE | 102013016805 A1 | 4/2015 | |
| DE | 102014001862 A1 | 8/2015 | |
| DE | 102014017609 A1 | 6/2016 | |
| DE | 102016111614 A1 | 1/2017 | |
| DE | 102016200902 A1 | 7/2017 | |
| EP | 0124093 A2 | 11/1984 | |
| EP | 0124093 A3 | 11/1984 | |
| EP | 1538028 A2 | 6/2005 | |
| EP | 3045340 A1 * | 7/2016 | ............. B60K 35/00 |
| EP | 3045340 A1 | 7/2016 | |
| EP | 3257697 A1 | 12/2017 | |
| FR | 3005618 A1 * | 11/2014 | ........ B60R 11/0235 |
| JP | 2013082362 A | 5/2013 | |
| JP | 2016124527 A * | 7/2016 | |
| WO | WO2007075461 A2 | 7/2007 | |

OTHER PUBLICATIONS

Official Journal of the European Union Jul. 16, 2008—Regulation 21 Uniform provisions concerning the approval of vehicles with regard to their interior fittings.
Chinese Office Action dated May 23, 2024 in corresponding application 202080069748.0.

* cited by examiner

POSITIONING SYSTEM FOR POSITIONING A DISPLAY DEVICE IN A MOTOR VEHICLE, AND A MOTOR VEHICLE

This nonprovisional application is a continuation of International Application No. PCT/EP2020/077030, which was filed on Sep. 28, 2020, and which claims priority to German Patent Application No. 10 2019 215 197.3, which was filed in Germany on Oct. 2, 2019, and which are both herein incorporated by reference.

BACKGROUND OF THE INVENTION

Field of the Invention

The present invention relates to a positioning system for positioning a display device for displaying optically perceptible information in a motor vehicle, and to a motor vehicle comprising the positioning system.

Description of the Background Art

Elements for equipping the interior of motor vehicles, which also include display devices as well as their connections to the supporting structures of a motor vehicle, must meet certain design requirements that ensure that the risk of injury to vehicle occupants is low, especially in the event of an accident. One risk is that a vehicle occupant sustains an injury by hitting their head on an interior trim element in an accident. Consequently, there is a requirement to reduce the corresponding risk or to keep it low. This requirement is ensured with the help of design standards as well as standardized tests simulating such a case, and which are defined, for example, in the ECE-R-21 regulation.

For reasons of visual design of the vehicle interior and to increase user friendliness, there is increasing interest in placing at least partially freestanding display devices with the largest possible display surface and/or user interface, for example, in the form of displays, especially in the area of the instrument panel. Freestanding display devices are characterized by the fact that they protrude beyond the trim of the instrument panel and are not fully integrated into it.

For the aforementioned safety considerations, freestanding display devices and/or their connections to the supporting structures of a motor vehicle must be designed so that the risk of injury in the event of a head impact is minimized.

Various solutions for placing display devices in vehicle interiors are known from the prior art.

CN 1443670 A, which corresponds to US 2003/0160135 discloses a device for placing a radio comprising a display in a motor vehicle. The device enables the display to be moved out of its plane of arrangement in an at least partial rotational movement for the purpose of enabling access to devices located behind the display, such as a cassette player. The rotational movement is made possible by means of a rail system.

EP 124093 A1 discloses a fixing device for fixing a display device, in particular in a ceiling element of a vehicle, for example, an aircraft, and a method for installing the fixing device. The device comprises a rail system for the purpose of installing the device in the vehicle. The display device, or display, can be swung out of the plane of the vehicle ceiling so that the display device screen is visible to a user.

Similarly, EP 1 538 028 A2, which corresponds to US 2005/0224689 and U.S. Pat. No. 7,712,707 B2 disclose solutions for moving a screen in a rotational motion to make it available to a user.

WO 2007/075461 A2, which corresponds to US 2009/0316057 shows an entertainment system for persons in a rear seat of a motor vehicle, which is installed on the back of a front seat. The entertainment system comprises a support member and an adjustment mechanism that allows the display device to be moved. In this case, the system provides for the possibility of both translational movement and rotation of the display device in order to thus optimize the available viewing angle range for a passenger in the rear of the vehicle. In this context, to protect the display device, a support member of the system can be equipped with a function or element that collapses or yields when a force acts on the display device or the screen, in particular when a person holds onto it and/or pulls on it.

To reduce the risk of head injury in the event of an accident, it is common in the prior art to design the instrument panel in which the display device is integrated, for example, by selecting materials such that the instrument panel yields in the event of a head impact. However, such an embodiment can have the result that operation-related vibrations of the vehicle are transmitted to the display device, which at least disturbs the readability of the displayed information and/or operation of the display device by a user.

SUMMARY OF THE INVENTION

It is therefore an object of the present invention to provide a positioning system for positioning a display device which equally well satisfies safety requirements in a simple and cost-effective manner and offers good operability with extensive freedom of design.

A first aspect of the invention is a positioning system for positioning a display device for presenting visually perceptible information, in particular a display, in a motor vehicle, in particular in a passenger car. The positioning system comprises the display device and a guide system. The guide system comprises at least one rail element and at least one slide element guidable with the rail element. In this regard, one of the two elements is fixed by means of a connection device to the display device, and the respective other element is designed to be connected to a supporting structure, in particular to a transverse member of an instrument panel of a motor vehicle.

The element, fixed to the display device, and/or the connection device are designed to break when a pulse p1 of more than 42 kg*m/s acts on a first display device region. The first display device region is spaced farther from a guide plane, defined by the guide system, than a dividing plane running parallel to the guide plane.

The positioning system further comprises at least one securing element which is rigidly connected by means of a first end region to the display device and by means of a second end region to the element designed for connection to the supporting structure. Thereby, the securing element is designed to be deformed, in particular buckled, when a pulse p2 of more than 42 kg*m/s acts on a second display device region, so that the guide system can achieve a substantially translational displacement of the display device by a relative movement between the rail element and the slide element in the guide plane. The second display device region is spaced less far from the guide plane than a dividing plane running parallel to the guide plane.

The positioning system is used to position the display device in a motor vehicle, in particular in the interior of a motor vehicle in the typical arrangement area of other instruments and fittings.

In the context of the invention, a display device can be understood to be a device by means of which visually perceptible information can be displayed. The display device may be designed to enable control and/or reading and display of one or more modules of the vehicle to which the display device is coupled in terms of information and/or control technology.

A display device of this type can be, for example, a display. The display device typically comprises a screen for displaying information and/or for inputting control commands, and a housing which is at least designed to receive the screen and typically has connections for supplying the display device with power and/or for exchanging data with other modules of a vehicle.

For example, the housing is essentially made of magnesium. Execution of the housing essentially from another metal, a metal alloy, and/or a plastic is not ruled out.

The screen is typically, but not necessarily, a combined input and output device. The screen can be a touch-sensitive screen such as a touchscreen, for example. When the positioning system is arranged in a motor vehicle as intended, the screen is oriented so that it faces the vehicle occupants. In other words, the screen is arranged in a screen plane which is oriented substantially perpendicular to the vehicle floor when the positioning system is arranged in a vehicle as intended. The display device, in particular the screen, is thus designed to be read and/or operated by vehicle occupants.

The part of the display device or display comprising the screen may be at least partially freestanding. A freestanding display is understood to be a display that is at least partially arranged in or on an instrument panel such that it protrudes beyond the trim of the instrument panel.

The positioning system comprises a guide system. The guide system comprises at least one rail element and at least one slide element. The rail and slide elements can be moved relative to one another in a guided relative movement. Typically, the guide system is formed by a plurality of rail and slide elements, wherein at least one slide element is usually associated with one rail element.

Typically, the guided relative motion is blocked with respect to at least one degree of freedom of the rotation and/or the translation. In particular, all degrees of freedom of the rotation, especially all degrees of freedom of the rotation and at least one translational degree of freedom of the relative movement between rail element and slide element are blocked. In a special embodiment, all degrees of freedom of the rotation and two translational degrees of freedom of the relative motion are blocked, so that only a relative motion in a two-dimensional plane is possible. In the latter case, a linear or straight guidance is realized by means of the guide system.

A guide plane in which the guided relative movement of the two elements to one another can be executed is defined by means of the rail element and the slide element. Typically, but not necessarily, the guide plane is a two-dimensionally extending plane, so that a linear guidance or a straight guidance is realized by the guide system. It is not ruled out, however, that the guide plane is curved at least in sections, in particular for the purpose of realizing the bringing together of rail and slide elements on a curved path of movement, for example, during an assembly process.

The guide system can comprise a plurality of rail elements. In one embodiment, the guide system comprises two rail elements which lie opposite one another in a common plane and on or in each of which at least one slide element can be arranged or is arranged.

The slide element is designed to be movably guided in or on the rail element. For this purpose, the slide element can be a sliding member or sliding block, for example. At least the sliding surfaces of the sliding member that are in mechanical contact with the rail element or are designed for mechanical contact with the rail element are advantageously equipped with a low-friction surface. In particular, the sliding member, or at least the sliding surfaces of the sliding member, is made of plastic, especially POM.

The slide element comprises at least one rolling body for minimizing friction in a relative movement between the slide element and the rail element.

The rail element can be designed or the rail elements are designed at least in sections as a profile open on at least one side, such as, for example, in the form of a U, C, or L profile. The slide element can be inserted or is inserted and movable in the inner space of the profile, which is delimited by the profile walls.

The slide element and/or the rail element can be equipped with a spring element. The spring element is designed to realize a tolerance compensation between the slide element and the rail element by bearing against the respective other element, so that the guide system only permits a relative movement of the two elements in one guide direction. In particular, the spring element serves to prevent the transmission of operation-related vibrations of a vehicle, equipped with the positioning system of the invention, to the display device, and/or to prevent the generation of vibration noise in the positioning system. A slide element region delimiting a recess can act resiliently, by way of example.

The rail element or the slide element can be mechanically fixed to the display device, in particular to the housing of the display device, by means of a connection device. The element, which is not fixed to the display device, is designed to be connected to a supporting structure, in particular to a transverse member of an instrument panel of a motor vehicle.

This means that either the rail element may be attached or attachable to the supporting structure and the slide element to the display device, or the slide element is attached or attachable to the supporting structure and the rail element to the display device.

In other words, an indirect mechanical connection between the display unit and the supporting structure is realized by means of the guide system.

A supporting structure can be to be understood as a structural element that is designed so that at least one element of the positioning device of the invention can be mechanically attached to it. In particular, the supporting structure is a transverse member of an instrument panel. Typically, the instrument panel is arranged in the interior of a motor vehicle and is designed to accommodate various instruments and display and control devices; often the instrument panel is a dash panel. The supporting structure or instrument panel is fixed or fixable to the body of a vehicle.

The connection device can comprise or form, for example, a mechanical, in particular a non-positive and/or positive, connection. By way of example, the connection device comprises a screw or riveted connection. However, it is not ruled out that the connection between the rail element or the slide element and the display device is alternatively or additionally realized by a material connection or an adhesive connection.

The positioning system of the invention further comprises a securing element. In an example, the securing element can be made at least in sections as a rod or sheet. In this case, the rod or sheet extends substantially parallel to the relative movement direction, defined by the guide system, between the slide element and rail element. The securing element can be, for example, a screw plate.

The securing element comprises a first end region and a second end region. The first end region is rigidly connected to the display device. The second end region is rigidly connected to the supporting structure. The respective connection can be realized both indirectly and directly. The rigid connection of the securing element to the supporting structure can be realized indirectly via a mechanical connection of the securing element to the element designed for connection to the supporting structure.

The securing element can be designed and/or arranged with respect to the display device in such a way that the securing element is deformable when at least one directional component of at least the pulse acts perpendicular to the first display device region on the display device.

The element fixed to the display device and/or the connection device by means of which the element fixed to the display device are fixed is designed to break when a pulse of more than 42 kg*m/s acts on a first display device region.

The first display device region in this case lies substantially in the screen plane.

In other words, the element, fixed to the display device, and/or the connection device can be designed, at least in sections, so that a predetermined break occurs when a specific pulse is applied. For this purpose, the element, fixed to the display device, and/or the connection device can be equipped with at least one predetermined breaking point, for example, in the form of a material weakening. The element, fixed to the display device, and/or the connection device are designed to break when a pulse of at least 42 kg*m/s is applied.

Breaking is also triggered when a force, in particular a shear force, can be introduced via the pulse into the element, fixed to the display device, and/or the connection device. Breaking is triggered in particular by the action of a force of at least 800 N, in particular at least 1000 N, especially in particular at least 1200 N on the element, fixed to the display device, and/or the connection device.

In the context of the invention, breaking can be understood as an at least partial mechanical destruction of the element and/or the connection device. At least part of the energy of the pulse p1 is absorbed by the breaking.

At least one further degree of freedom of the display device with respect to the supporting structure, which was previously blocked by the guide system, is released by the breaking. In particular, at least one degree of freedom of the rotation is released, whereby the display device, or at least the region of the display device on which the pulse p1 acts, can yield to the pulse p1 in an evasive rotational movement.

The evasive rotational movement takes place around an axis of rotation. The axis of rotation of the evasive rotational movement lies in a plane parallel to the dividing plane or in the dividing plane itself. Further, the axis of rotation is located on the display device housing side facing away from the screen plane.

The axis of rotation extends substantially perpendicular to the direction of relative movement between the slide element and the rail element.

The pulse p1, which causes breaking, is greater than 42 kg*m/s. This corresponds to the test conditions of a head impact test according to ECE-R-21, for example.

The pulse p1 acts on a first display device region. The first display device region in this case is spaced farther from a guide plane than an ideal dividing plane running parallel to the guide plane.

The display device region on which the pulse p1 acts with at least one directional component lies substantially in the screen plane.

The first display device region on which the pulse p1 acts faces the sitting position of the vehicle occupant when the positioning device is arranged in a motor vehicle as intended. When the positioning device is arranged in a motor vehicle as intended, the first display device region is the upper, in particular freestanding, region of the display device or screen.

The ideal dividing plane divides the display device region, on which a pulse acts perpendicularly with at least one directional component of the pulse, into a first display device region above the dividing plane and a second display device region below the dividing plane.

The dividing plane is substantially aligned parallel to the guide plane. In other words, the two planes are equidistantly spaced from one another substantially at every point.

The guide plane can intersect the second display device region.

When a pulse p2 of more than 42 kg*m/s acts on the second display device region, and thus on a region below the dividing plane, a substantially translational displacement of the display device occurs due to a relative movement between the rail element and the slide element, one of which is connected to the display device.

In this case, the pulse p2 acts with at least one directional component perpendicular to the second display device region.

The translational displacement causes a deformation of the securing element. In particular, the action of the pulse p2 causes the securing element to buckle, wherein deformation due to at least sectional torsion and/or bending of the securing element is also not ruled out. The energy of the pulse p2 is at least partially converted into deformation work.

The deformation of the securing element, as a result of the pulse p2, reduces the distance, measured as a perpendicular projection onto the guide plane, between the first end region of the securing element and the second end region of the securing element. In other words, the distance between the display device and the supporting structure is reduced by the translational displacement of the display device with respect to the supporting structure. The translational displacement of the display device, which is triggered by the action of the pulse p2, can also be referred to as a translational evasive movement.

It is not ruled out that the action of the pulse p1 and/or the pulse p2 causes both a rotational evasive movement and an evasive rotational movement of the display device. In other words, it is not ruled out that the pulse p1 and/or the pulse p2 cause a breaking of the element, fixed to the display device, and/or the connection device and a deformation of the securing element and thus both evasive movements occur in combination.

The mechanical connections that fix the display device with respect to the supporting structure are designed not to be damaged when a force is applied to a freestanding region of the display device, for example, in the form of bracing against or holding onto the display device.

Further, the mechanical connections that fix the display device with respect to the supporting structure are designed to be vibration-damped such that operation-related vibrations do not lead to a perceptible vibration of the display device, so that reading and/or operating the display device by a vehicle occupant are not hampered by vibrations.

The particular advantage of the positioning system of the invention is that an evasive movement of the display device in the vehicle interior occurs both in the event of a head impact above the dividing plane and in the event of a head impact below the dividing plane, which reduces the risk of injury to the vehicle occupants in the event of an accident. The positioning system of the invention thus enables the use of particularly large displays that can be arranged at least partially freestanding in vehicles without posing an additional risk of injury.

The securing element can be designed such that a mechanical connection, realized by means of the securing element, between the display device and the element designed for connection to the supporting structure is maintained when the pulse p1 acts on the first display device section.

In other words, the mechanical connection, realized by means of the securing element, between the display device and the supporting structure is designed to remain intact even if the indirect connection, realized by means of the guide system, between the display device and the supporting structure is at least partially damaged by breaking the element, fixed to the display device, and/or the connection device.

This means that even if all the degrees of freedom of the display device blocked by the guide system are released by the action of the pulse p1, the mechanical connection, realized by the securing element, between the display device and the supporting structure is maintained.

In other words, the action of the pulse p1 does not completely destroy either the connection of the first end region to the display device or the connection of the second end region to the element designed for connection to the supporting structure. In this case, a mechanical weakening of the connections cannot be ruled out, however.

The securing element is typically made of a metal or metal alloy, in particular a steel.

The advantage of this embodiment is that in the event of an accident, the display device is not completely detached from the supporting structure and thus cannot move freely in the passenger compartment.

A distance 'a', perpendicular to the guide plane, between the guide plane and the dividing plane can be in a ratio b/a to a distance b, perpendicular to the guide plane, between the guide plane and a display device boundary farthest from the guide plane, where b/a>1, in particular b/a>3, very particularly b/a>6.

The distances a and b can each be understood as measured perpendicular to the guide plane.

The position of the ideal dividing plane is determined, if necessary, by a trim element of an instrument panel which, at least when a pulse is applied, rests against the display device, in particular against a rear side of the display device.

The boundary of the display device farthest from the guide plane refers to a boundary edge or boundary surface of the screen or of the housing area surrounding the screen. Typically, but not necessarily, the screen is oriented substantially perpendicular to the guide plane.

The region of the display device bounded by the dividing plane and the display device boundary farthest from the guide plane is essentially the freestanding region of the display device, or in other words, the region of the display device that extends farthest beyond the instrument panel trim.

The greater the ratio b/a, the farther the freestanding region of the display device protrudes beyond the instrument panel trim.

Typically, the greater the ratio b/a, the larger the first display device region is relative to the second display device region. Accordingly, in the event of an accident-related head impact on the display device, the display device is more likely to swerve due to an evasive rotational movement. In other words, the rotational evasive motion is preferred in this embodiment.

The advantage of this example is the possibility of arranging as large a display device region as possible, in particular that of the display device region comprising the screen, freestanding in the interior of a vehicle.

The slide element can be fixed to the display device and the rail element can be designed to be connected to a supporting structure, in particular to a transverse member of the instrument panel of a motor vehicle.

The rail element can be designed to be rigidly connected, in particular welded, to a supporting structure. Further, the slide element and/or the connection device for connecting the slide element to the display device can be designed to break when the pulse p1 is applied.

The rail element is typically made of a metal or metal alloy. The rail element may comprise sliding surfaces for the low-friction movement of the slide element.

During the intended arrangement of the positioning system in a motor vehicle, in other words during assembly, the rail element is typically first fixed to the supporting structure and then the display device is inserted by means of the slide element in an insertion movement relative to the supporting structure into the space provided for accommodating the display device in the motor vehicle.

The securing element can be connected with its second end region to the rail element and with its first end region to the slide element.

The distance between the first end region and the second end region of the slide element determines the end position of the display device with respect to the supporting structure when the positioning system is mounted in a motor vehicle.

The advantage of this example is the easy installation of the positioning system in a motor vehicle.

The securing element can comprise at least two legs arranged relative to one another such that the legs define an angle $\beta$, where $45°>\beta<180°$.

In other words, the securing element can comprise at least one bend, wherein the edge formed by the bend extends perpendicularly to the relative movement of the display device with respect to the supporting structure in the guide plane, so that the angle $\beta$ can be reduced when the pulse p2 acts on the display device. The securing element can be pre-bent due to the angular arrangement of the legs.

The securing element is designed so that a reduction of the angle $\beta$ or a further buckling takes place at a compressive load of at least 400 N. If the positioning system comprises multiple securing elements, the required compressive load per securing element is proportional to the reciprocal of the number of securing elements, at least insofar as the securing elements are oriented substantially parallel to one another.

Preferably, the angle $\beta$ is between 90° and 180°. Particularly preferably, the angle $\beta$ is between 130° and 150°. In this case, the apex of the angle typically, but not necessarily, faces away from the guide plane.

It is not ruled out that the securing element comprises more than two legs. It is also not ruled out in this case that the securing element comprises more than one angle.

When the pulse p2 is applied, at least part of the energy of the pulse is converted into the deformation work of the securing element, therefore, its deformation.

The advantage is that the translational evasive movement of the display device triggered by the pulse p2 is not blocked by the securing element, whereas the securing element in the mounted state fixes the position of the display device with respect to the supporting structure.

The guide system comprises two slide elements, spaced apart from one another, for each rail element. In this case, at least the slide element, farther away from the first display device region, and/or the connection device, farther away from the first display device region, are designed to break when the pulse p1 acts on the first display device region.

For each rail element, the positioning system comprises two slide elements that are spaced apart from one another in the guide plane and along a guide direction defined by the rail element. In this case, one of the two slide elements is farther away from the first display device region than the respective other slide element, which is assigned to the same rail element. The slide element farther away from the first display device region may also be referred to as the rear slide element. The slide element located closer to the first display device region can also be referred to as the front slide element.

The distance between the two slide elements, which are both assigned to one rail element, is at least 30 mm, preferably at least 50 mm, particularly preferably at least 80 mm. At least the slide element, farther away from the first display device region, and/or the connection device, farther away from the first display device region, are designed to break when the pulse p1 acts, so that an evasive rotational movement of the display device is released. It is not ruled out in this case that only the more remote slide element is connected by means of a connection device to the display device which is designed to break. In this case, the other slide element acts as a joint.

The advantage of this example is that the slide element, closer to the first display device region, and/or the connection device, closer to the first display device region, are retained when the pulse p1 acts, and thus only one degree of freedom of the rotation of the display device is released after a break.

The positioning system comprises at least two rail elements. Typically, but not necessarily, the rail elements are arranged on the side of the housing of the display device in a plane perpendicular to the screen plane.

The positioning system can comprise two slide elements per rail element. The four slide elements are fixed to the housing of the display device by means of connection devices. The two front and two rear slide elements lie opposite each other in pairs. At least the two rear slide elements and/or the rear connection elements are designed to break when the pulse p1 is applied.

The connection of the securing element to the display device can be pivotable and/or the connection of the securing element to the element designed for connection to the supporting structure corresponds to a fixed clamping.

In other words, the connection of the securing element to the display device is a mechanical connection that has at least one degree of freedom of rotation. In other words, the connection allows for some play. This can be realized, for example, by means of a screwed or riveted connection.

A fixed clamping, on the other hand, is understood to be a connection in which all degrees of freedom of translation and rotation are blocked. This is realized, for example, by a welded joint.

The positioning system further comprises an instrument panel designed to position the display device in a motor vehicle interior.

In this context, an instrument panel can be understood to be a device for accommodating display and control devices in a vehicle in front of the driver's sitting position.

Typically, an instrument panel in the context of the invention comprises a supporting structure, which is designed to be fixed to a vehicle body, and at least one trim element. The instrument panel in the context of the invention may be a dashboard.

At least when pulse p2 is applied and the display device can be displaced as a result, at least the instrument panel, in particular a shaped element of the instrument panel, is in contact with the display device in some areas. Here, the distance between an area of contact of the instrument panel on the positioning system is the distance 'a' between the guide plane and the dividing plane.

A shaped element can be understood as a trim part by way of example.

At least when pulse p2 and/or pulse p1 act, the instrument panel is in contact with the display device, in particular with a display device region facing away from the screen plane, in a contact area. In other words, the instrument panel abuts the display device at the back of the screen. The display device region located above the contact area when arranged in a vehicle as intended is the freestanding area of the display device. It is not ruled out for the instrument panel to be in contact with the display device even without the action of a pulse.

The area of the contact determines the position of the dividing plane parallel to the guide plane. If the instrument panel lies flat in the contact area, the dividing plane intersects the contact surface at its centroid. In other words, the centroid of the contact surface must be used to determine the distance 'a' in the case of a flat contact of the instrument panel.

Advantageously, the instrument panel, in particular at least the areas of the instrument panel adjacent to the display device, is at least partially deformable when said pulses act, so that a translational evasive movement of the display device due to the action of pulse p2 is not completely blocked by the instrument panel.

A further aspect of the invention is a motor vehicle, in particular a passenger car, comprising at least one positioning system of the invention for positioning a display device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
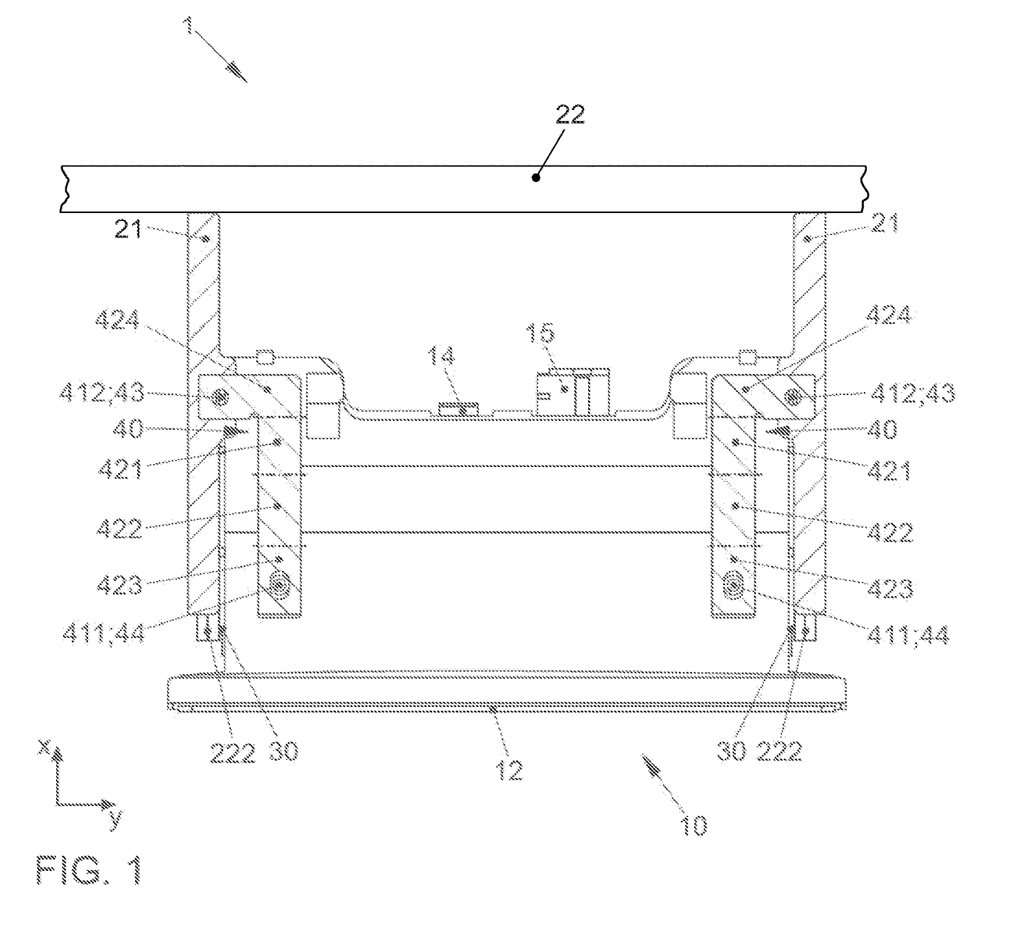
FIG. 1: shows an example of the positioning system of the invention in a top view in an x-y plane.

FIG. 1 shows a positioning system 1 of the invention in a top view in an x-y plane. When positioning system 1 is arranged as intended in a motor vehicle, the x-y plane corresponds to a plane substantially parallel to the vehicle floor. The x-direction corresponds to the direction in which the longitudinal axis of the vehicle extends. The y-direction corresponds to the direction in which the transverse axis of the vehicle extends.

Positioning system 1 of the invention comprises a display device 10. In the example shown, display device 10 comprises a screen 12 which is arranged in a screen plane and which, when arranged in a vehicle as intended, faces the occupants of the vehicle, and a housing 11. Screen 12 is integrated into housing 11 by being attached to or in it. Display device 10 can also be referred to as a display. Display device 10 can be connected to the vehicle or modules of the vehicle by means of first port 14 and second port 15 in terms of information and/or control technology and for the purpose of the power supply.

It can further be seen that positioning system 1 comprises two rail elements 21. Four slide elements are arranged within rail elements 21, of which only the front slide elements 222 are visible in the illustration shown. Slide elements 222 are mechanically connected to display device 10 or housing 11 of display device 10 by means of connection devices 30. Rail elements 21 are designed to be mechanically connected to a supporting structure 22, in particular a transverse member of an instrument panel. For example, rail elements 21 can be welded to the supporting structure 22.

Slide elements 222 and rail elements 21 together form a guide system. Due to the respective mechanical connection between slide elements 222 and display device 10 as well as rail element 21 and the supporting structure, the guide system enables a guided relative movement substantially in the x-direction between the supporting structure and display device 10. The relative movement takes place in a guide plane which is defined by the guide system and extends in the x-y plane. Typically, as in the example shown, the guide system defines a straight or linear guideway with a two-dimensional guide plane.

Typically, during assembly of positioning system 1, rail elements 21 are first connected, in particular welded, to the supporting structure. Following this in time, display device 10 connected to slide elements 222 is inserted at least in sections on the guide plane, defined by rail elements 21, until it reaches an end position in a space typically bounded by the instrument panel or sections of the instrument panel. In this way, display device 10 is positioned in a vehicle interior.

FIG. 1 further shows that each of the two rail elements 21 is connected to a respective securing element 40. In the example shown, securing elements 40 have an L-shape in the top view. The second end regions 412 of securing elements 40 are rigidly connected to rail elements 21 by means of welded connections 43 in such a manner that the connections correspond to rigid clampings.

The first end regions 411 of securing elements 40 are connected to display device 10, in particular to housing 11 of display device 10, by means of screw connections 44. During assembly, the connections between securing elements 40 and display device 10 are made in terms of time after display device 10 has been inserted by means of the guide system. Among other things, screw connection 44 determines and fixes the position of display device 10 with respect to rail elements 21. In this way, fixation with respect to the instrument panel takes place at the same time, so that display device 10 is positioned in the vehicle interior and fixed with respect to its position in the x-direction. First end regions 411 are typically concealed by a shaped element, in particular a trim element, of the instrument panel after positioning system 1 has been installed in a vehicle.

Each securing element 40 recognizably comprises four legs. An angle is formed between first leg 421 and second leg 422, between first leg 421 and fourth leg 424, and between second leg 422 and third leg 423. In other words, the securing element has three bends, wherein the edges formed by the respective bend extend substantially in the y-direction, and thus perpendicular to the relative movement of rail element 21 and slide element 222 along the guide plane.

Figure 2:
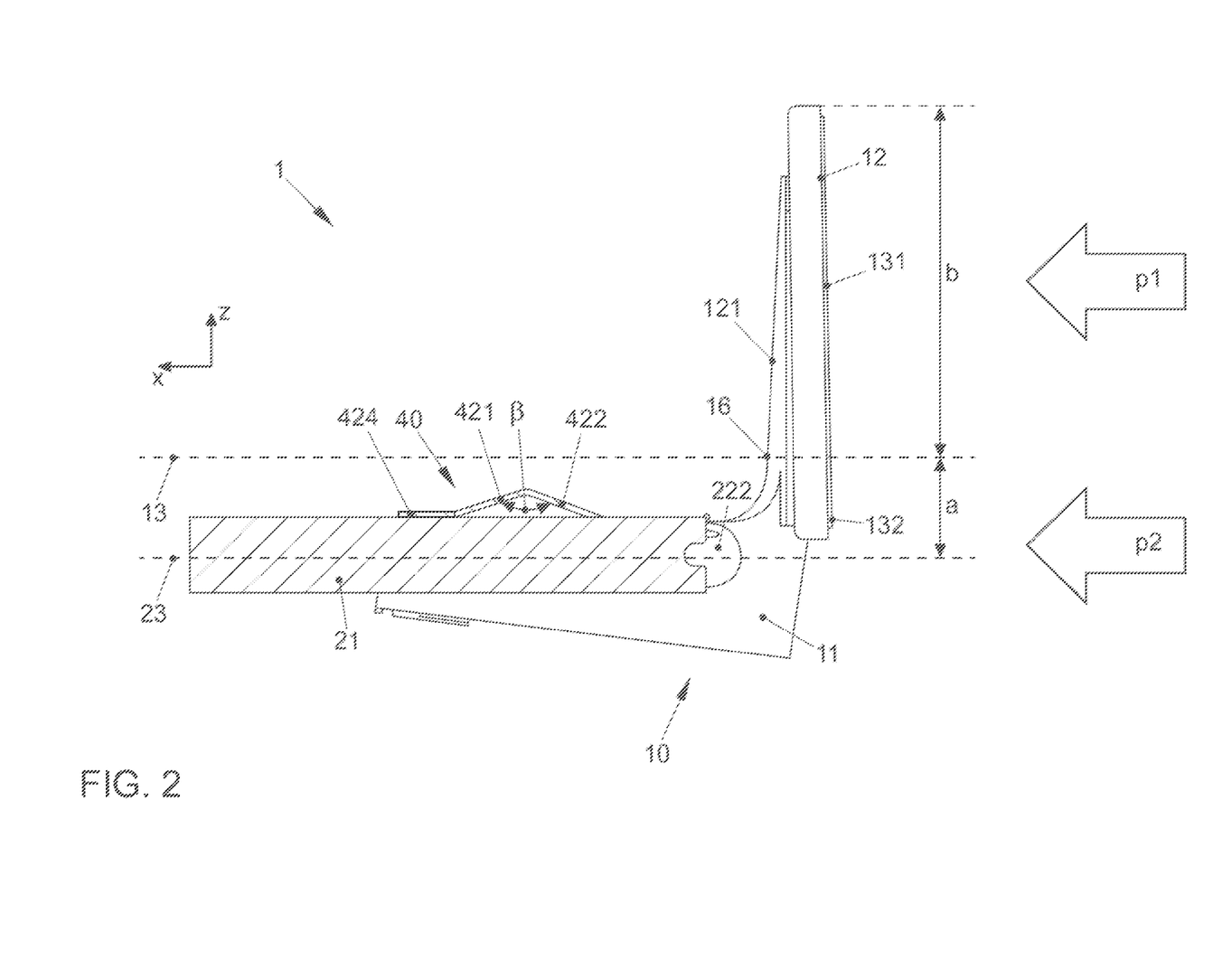
FIG. 2: shows the positioning system of the invention according to FIG. 1 in a side view in the x-z plane.

FIG. 2 shows the embodiment according to FIG. 1 in a side view in the x-z plane. The arrangement of the elements of positioning system 1 relative to one another in FIG. 2 corresponds to the arrangement of the elements relative to one another during the intended positioning in a motor vehicle without a pulse p1 or p2 having acted.

Display device 10, comprising housing 11 and screen 12, can be seen. Also visible is a front slide element 222, which is partially disposed within a rail element 21 with which it forms at least one part of the guide system.

FIG. 2 also shows a securing element 40. In the view shown, first leg 421, second leg 422, and fourth leg 424 are visible. The third leg is hidden by rail element 21 in the illustration. An angle $\beta$ is formed between first leg 421 and second leg 422. The angle $\beta$ in the example shown is between 130° and 150°. The bisector of the angle $\beta$ runs essentially perpendicular to guide plane 23. The apex of the angle $\beta$ faces away from guide plane 23. In other words, by means of first leg 421 and second leg 422, securing element 40 forms a bend that points away from guide plane 23 and extends perpendicular to the direction of guided relative movement of rail element 21 and slide element 222.

FIG. 2 also shows guide plane 23, defined by the guide system, and dividing plane 13 running parallel to it, shown in each case as a dashed line.

The ideal dividing plane 13 divides the display device, in particular the plane of display device 10 in which screen 12 is arranged, into two regions, namely, a first display device region 131 and a second display device region 132. The position of the dividing plane is determined substantially by the contact area 16. In contact area 16, the instrument panel, in particular a shaped element of the instrument panel, is in contact with screen back 121. The instrument panel is not shown here. It should not be ruled out that the contact of the instrument panel with the display screen back 121 in contact area 16 is only realized by an at least partial translational displacement of the display device, for example, by a pulse.

If positioning system 1 does not have an instrument panel, the position of the dividing plane is determined by the mechanical connection between securing element 40 and display device 10.

The housing area of display device 10, said area comprising screen 12, projects in the z-direction clearly beyond dividing plane 13 and thus beyond the instrument panel trim. In other words, display device 10, particularly the part of display device 10 that comprises screen 12, is substantially freestanding. The vertical distance 'a' between guide plane 23 and dividing plane 13 is typically smaller than the distance b between dividing plane 13 and the area of display device 10 that is vertically farthest away from guide plane 23.

When a pulse p1 is applied to first display device region 131, display device 10 evades the acting pulse in such a way that a rotational movement of the display device about an axis of rotation can be executed. The axis of rotation about which the evasive rotational movement takes place is located essentially in contact area 16 and extends along or at least parallel to the dividing plane 13 in the y-direction. The evasive rotational movement of display device 10 is made possible by transmitting, via display device 10, the pulse at least partially to slide elements 21 and/or connection devices 30. As a result, an at least partial destruction of slide elements 21 and/or connection devices 30 occurs, so that at least one degree of freedom of the rotation of display device 10 is released and display device 10 can yield to pulse p1.

When a pulse p2 is applied to second display device region 132, and thus in the z-direction below dividing plane 13, a substantially translational evasive movement of display device 10 occurs in the x-direction. The translational evasive movement is guided by the guide system so that the movement takes place in guide plane 23. The energy of pulse p2 is at least partially absorbed by securing devices 40 in that the angle β decreases due to the translational evasive movement of display device 10 in the x-direction.

Figure 3:
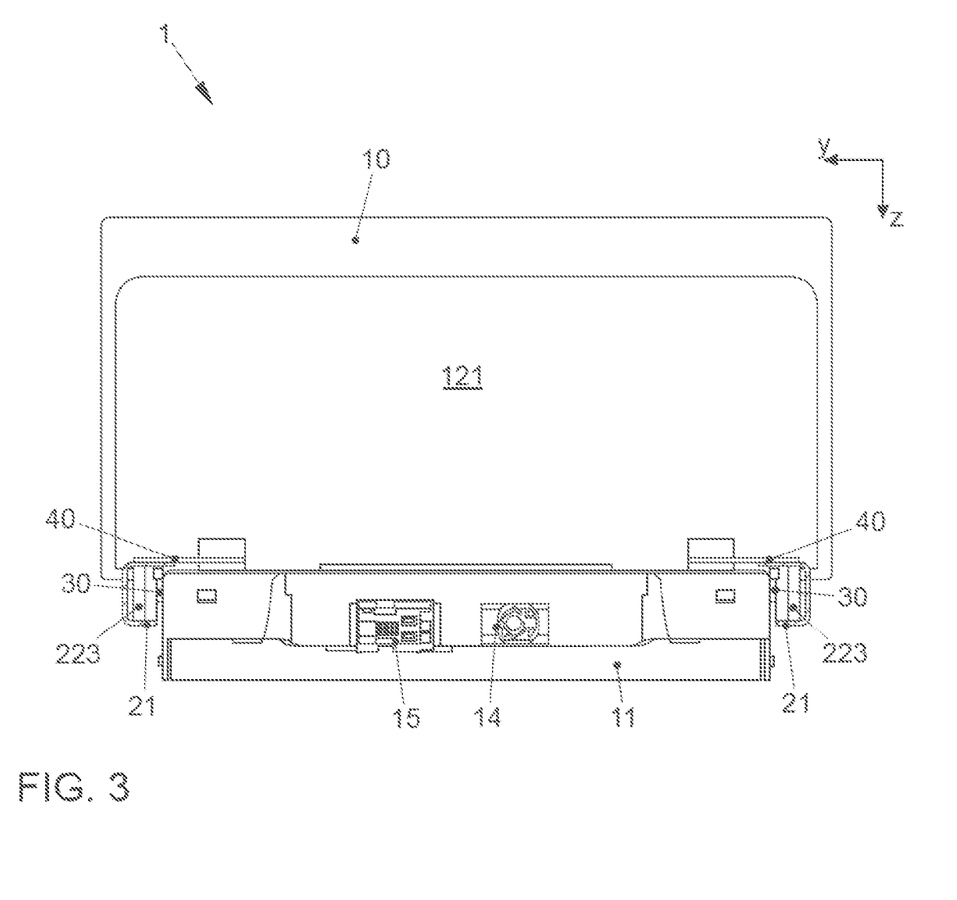
FIG. 3: shows the positioning system of the invention according to FIG. 1 and FIG. 2 in the rear view of the positioning system in the y-z plane.

FIG. 3 shows the embodiment of positioning system 1 of the invention according to FIGS. 1 and 2 in the rear view in the y-z plane. Screen back 121 of display device 10 faces the viewer in this illustration. According to FIG. 1, first port 14 and second port 15 of display device 10 can also be seen here.

FIG. 3 shows that rail elements 21 in cross section are formed at least partially as profiles open on one side on their side facing housing 11, said profiles in which slide elements 223 are arranged. Due to the depiction, only the rear slide elements 223 can be seen here. In an analogous manner, the front slide elements are arranged in the guide plane in rail elements 21. Also shown is connection device 30 between housing 11 of display device 10 and slide elements 223. Securing elements 40 can also be seen in this view.

Figure 4:
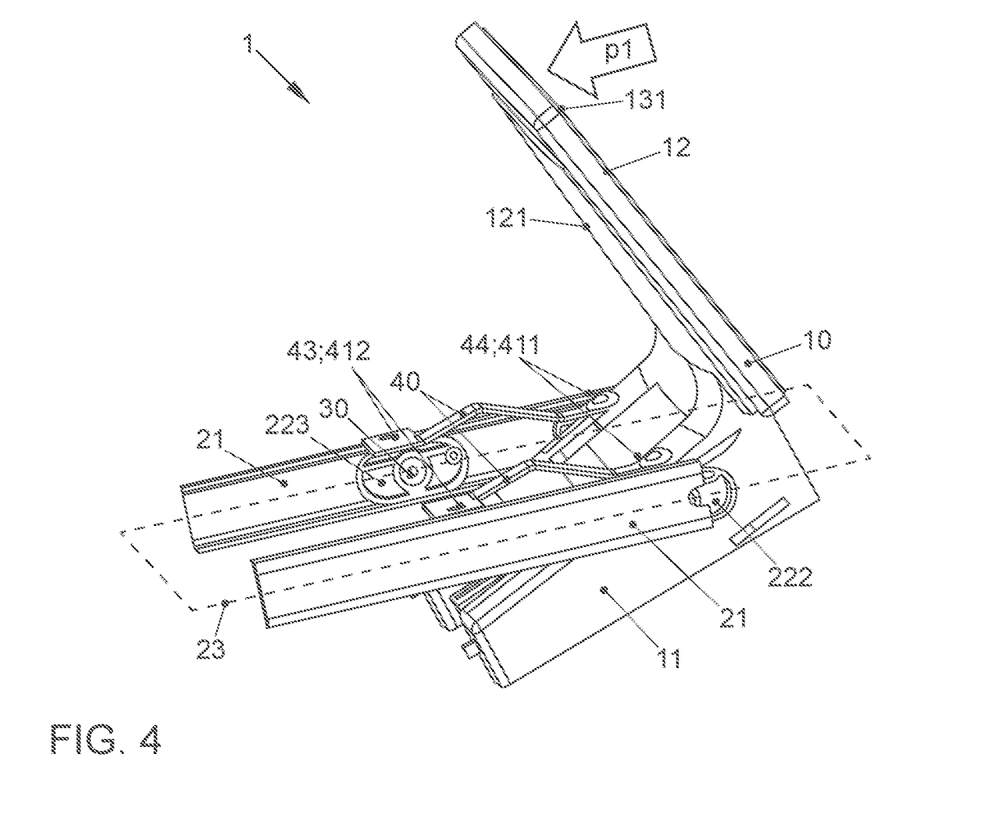
FIG. 4: is a three-dimensional representation of the positioning system of the invention after the action of pulse p1 on the first display device region.

FIG. 4 shows a three-dimensional view of positioning system 1 of the invention after pulse p1 has acted on a first display device region 131. It can be seen, in particular in comparison with FIG. 2, that the position of display device 10 with respect to guide plane 23 defined by the guide system is changed by a substantially rotational evasive movement of display device 10.

Of the four total slide elements 222, 223 present in this embodiment, a front slide element 222 can be clearly seen which is at least partially disposed within rail element 21 facing the viewer. Similarly, a second front slide element 222 is disposed in the opposite rail element 21, which is substantially concealed by housing 11 of display device 10 in the illustration in FIG. 4.

Also clearly visible is a rear slide element 223. A second rear slide element 223 is arranged opposite, but is completely concealed by rail element 21 facing the viewer.

In contrast to the illustrations in FIGS. 1 to 3, rear slide elements 223 do not have a connection to display device 10 by means of connection device 30. The action of pulse p1 on positioning system 1 caused an at least partial destruction or breaking of connection device 30, which caused an evasive rotational movement of the display device, by means of which the display device was able to evade pulse p1.

It can be seen that securing elements 40 are further connected to rail elements 21 by means of welded joints 43 in second end region 412. Further, display device 10 is connected to securing elements 40 by means of the screw connections 43 in first end region 411 even after pulse p1 has acted. Even if pulse p1 causes all four connections between the guide system and display device 10 to break or be destroyed, the connection realized by means of securing elements 40 remains intact. In other words, securing element 40 ensures a mechanical connection of display device 10 to the supporting structure even if all translational and rotational degrees of freedom of display device 10 are released by the destruction of the connection between the guide system and display device 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A positioning system for positioning a display device for presenting visualy perceptible information on a display in a motor vehicle, the positioning system comprising:
    a guide system with at least one rail element and at least one slide element guidable with the at least one rail element, the at least one rail element or the at least one slide element being fixed via a connection device to the display device and the other of the at least one rail element or the at least one slide element being connectable to a supporting structure of an instrument panel of the motor vehicle, the at least one rail element or the at least one slide element fixed to the display device, via the connection device, is configured to break when a pulse p1 of more than 42 kg*m/s acts on a first display region that is farther away from a guide plane, defined by the guide system, than a dividing plane running substantially parallel to the guide plane; and
    at least one securing element rigidly connected via a first end region to the display device and via a second end region to the other of the at least one rail element or the at least one slide element connected to the supporting structure,
    wherein the at least one securing element is designed to become deformed or buckled when a pulse p2 of more than 42 kg*m/s acts on a second display device region, which is less distant from the guide plane than a dividing plane running substantially parallel to the guide plane so that the guide system achieves a substantially translational displacement of the display device by a relative movement between the at least one rail element and the at least one slide element in the guide plane.

2. The positioning system according to claim 1, wherein the at least one securing element is designed such that a mechanical connection, realized via the at least one securing element, between the display device and the other of the at least one rail element or the at least one slide element connected to the supporting structure is maintained when the pulse p1 acts on the first display device section.

3. The positioning system according to claim 1, wherein a distance substantially perpendicular to the guide plane, between the guide plane and the dividing plane, is in a ratio b/a to a distance b, substantially perpendicular to the guide plane, between the guide plane and a boundary of the display device farthest from the guide plane, where b/a>1, or b/a>3 or b/a>6.

4. The positioning system according to claim 1, wherein the at least one slide element is not fixed to the display device and the at least one rail element is designed to be connected to the supporting structure of the instrument panel of the motor vehicle.

5. The positioning system according to claim 1, wherein the at least one securing element comprises at least two legs arranged relative to one another such that the legs define an angle $\beta$, where $45°>\beta<180°$.

6. The positioning system according to claim 1, wherein the at least one slide element of the guide system comprises two slide elements, spaced from one another, for each respective one of the at least one rail element, wherein at least one of the two slide elements farther away from the first display device region and/or the connection device farther away from the first display device region, are designed to break when the pulse p1 acts on the first display device region.

7. The positioning system according to claim 1, wherein the connection of the at least one securing element to the display device is pivotable and/or the connection of the at least one securing element to the other of the at least one rail element or the at least one slide element connected to the supporting structure corresponds to a fixed clamping.

8. The positioning system according to claim 1, wherein the positioning system further comprises an instrument panel designed to position the display device in a motor vehicle interior.

9. The positioning system according to claim 8, wherein at least when a pulse p2 is applied and the display device is displaced as a result, at least the instrument panel or a shaped element of the instrument panel is in contact with the display device, and wherein a distance between an area of contact of the instrument panel on the positioning system is the distance 'a' between the guide plane and the dividing plane.

10. A motor vehicle comprising at least one positioning system according to claim 1 for positioning a display device.

11. The positioning system according to claim 1, wherein the supporting structure is a transverse member of the instrument panel of the motor vehicle.

\* \* \* \* \*